Figure 1:
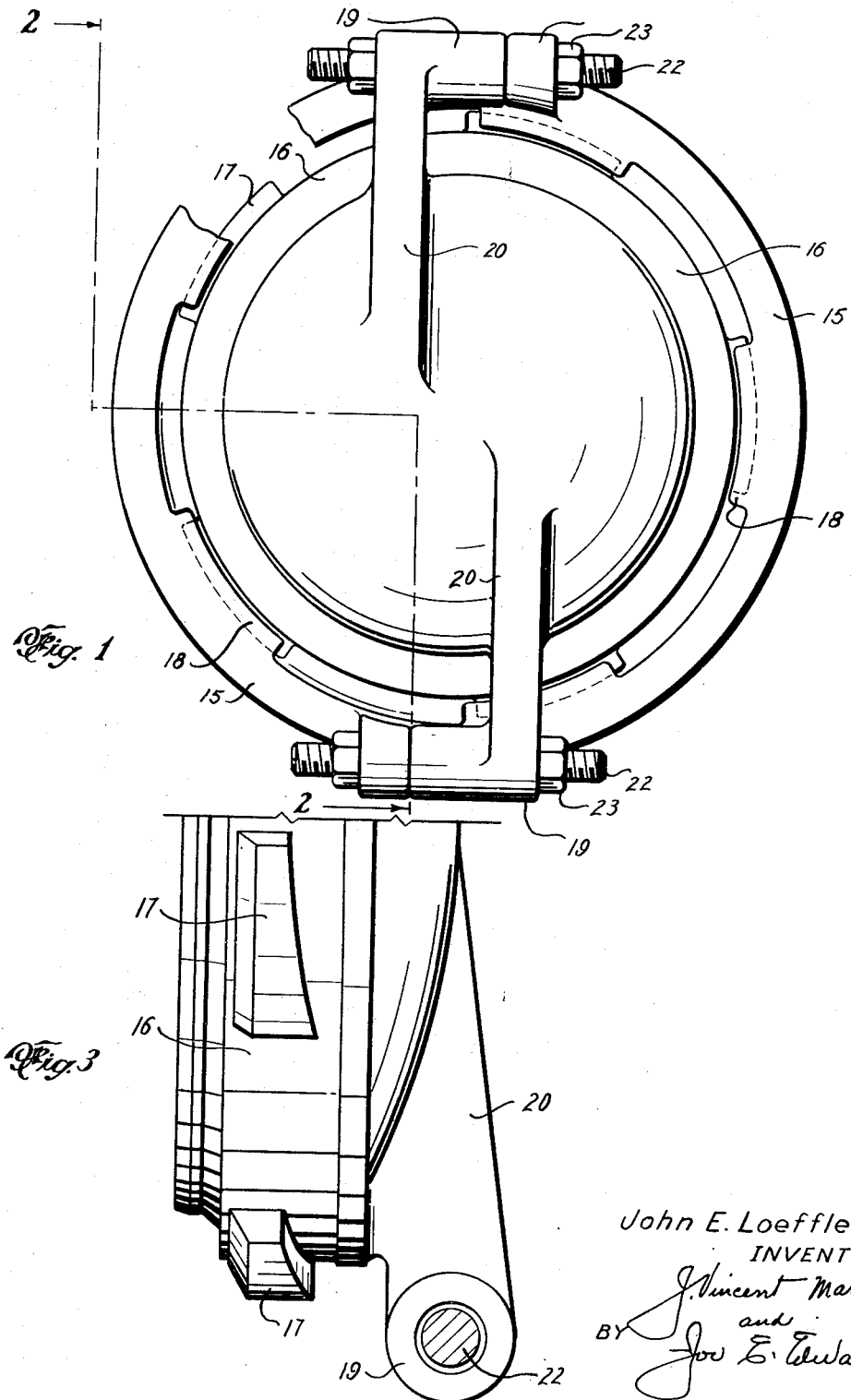

July 27, 1954  J. E. LOEFFLER  2,684,861
SEALING ASSEMBLY

Filed Jan. 17, 1949  3 Sheets-Sheet 2

John E. Loeffler
INVENTOR,

BY J. Vincent Martin
and
Joe E. Edwards
ATTORNEYS

July 27, 1954    J. E. LOEFFLER    2,684,861
SEALING ASSEMBLY
Filed Jan. 17, 1949    3 Sheets-Sheet 3
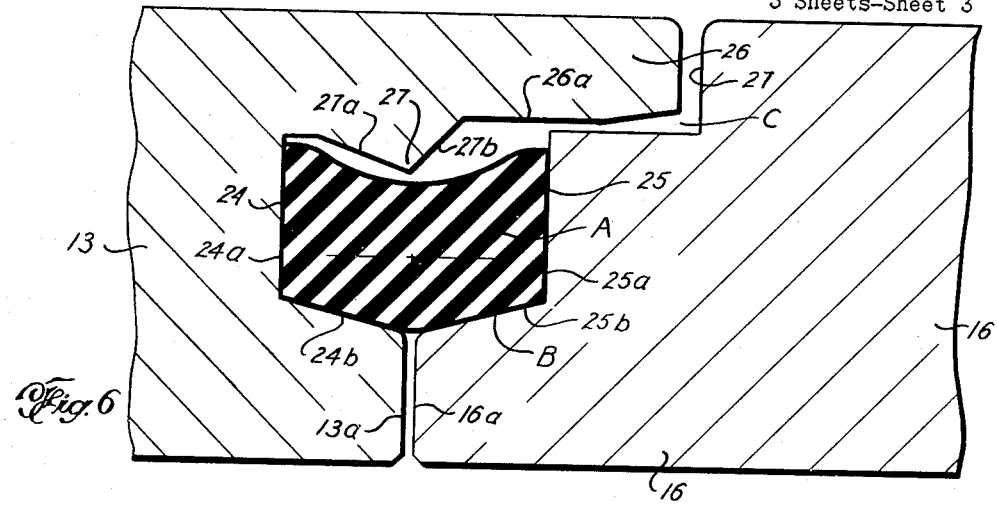
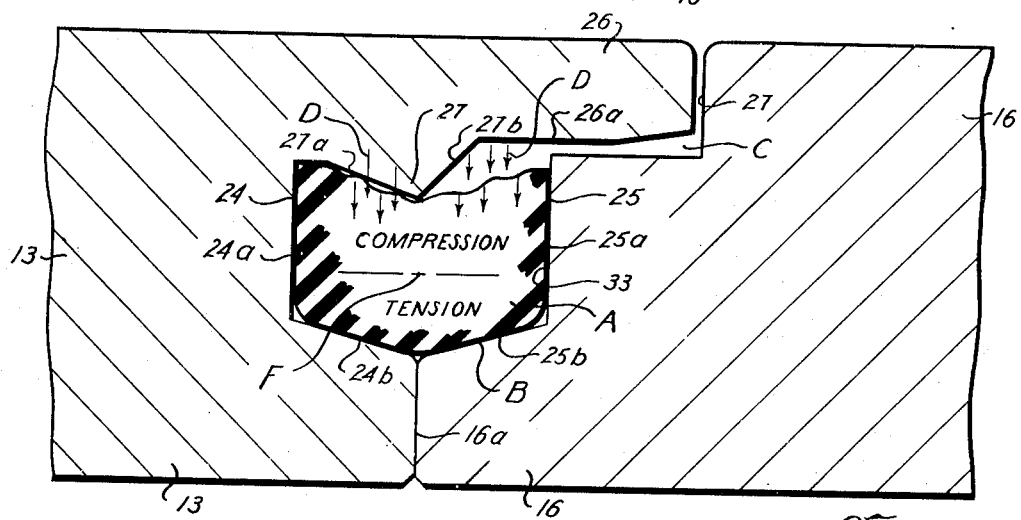
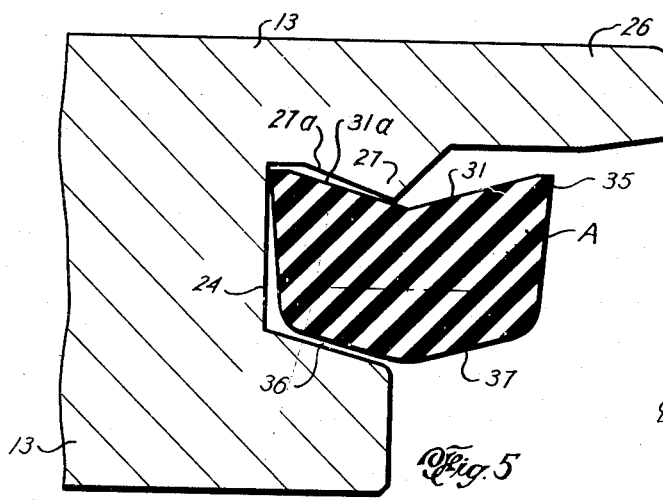
John E. Loeffler
INVENTOR
ATTORNEYS Patented July 27, 1954

2,684,861

UNITED STATES PATENT OFFICE 2,684,861

SEALING ASSEMBLY

John E. Loeffler, Houston, Tex., assignor to Thornhill-Craver Co., Inc., Houston, Tex., a corporation of Texas Application January 17, 1949, Serial No. 71,333

5 Claims. (Cl. 285—180)

This invention relates to new and useful improvements in sealing assemblies and in sealing elements for such assemblies.

The invention relates particularly to sealing or packing elements of the pressure seal type, such as are employed in coupling or similar members for connecting and sealing the joints in pipe lines or other pressure fluid conductors.

One object of the invention is to provide an improved sealing assembly for sealing the joint between adjacent sections in a fluid pressure conductor which assembly may be constructed of a relatively light weight material and which will effectively seal over a wide range of pressure conditions, whereby the assembly is substantially universally adaptable for use with all pressure fluid conductors.

Another object of the invention is to provide an improved sealing assembly wherein the sealing or packing element is placed under an initial or preload when the coupling member is made up to assure effective sealing under relatively low pressure conditions, with the assembly being so constructed that only a predetermined controlled tightening pressure may be applied to the assembly by the operator to thereby eliminate the human element of error and positively prevent overtightening or excessive loading of the material of which the assembly is constructed, whereby it is possible to employ relatively light weight material, such as aluminum, aluminum alloy or the like, in the manufacture of the coupling members of the assembly.

An important object of the invention is to provide an improved sealing or packing element of the pressure seal type which is of such shape and configuration that it will effectively seal over a wide range of pressure conditions.

A particular object is to provide an improved annular sealing element which is constructed of resilient material such as rubber, rubber compound or the like and which has a shape in cross-section providing flared low-pressure sealing lips at opposite sides thereof, with the configuration of said element being such that upon the application of high pressure to the element said element is urged into further sealing engagement, whereby said element will efficiently seal under low or high pressures.

A further object is to provide an annular sealing ring or gasket having improved flared sealing lips which are so constructed with relation to the body of the ring that preloading of the lips which seal against lower pressures places the high pressure sealing areas of the ring under tension, whereby when the ring is subsequently subjected to higher pressures, effective sealing is produced and deformation or extrusion of the ring into the joint being sealed is prevented.

Still another object is to provide a pressure seal ring or gasket, of the character described, wherein the ring in cross section is generally V-shaped to form flared low pressure sealing lips, with the base sealing surfaces of the ring being inclined with respect to a plane at a right angle to the transverse center line of the ring; the body of the ring being somewhat thickened and reinforced between the flared lips to lend support to the sealing lips and thereby assure sealing by the lips under initial preload of the ring; the construction also locating the fulcrum point about which the sealing lips move a sufficient distance from the sealing surfaces on the base of the ring to assure placing the areas adjacent said surfaces under tension when the sealing lips are placed under initial preload.

Still another object of the invention is to provide an improved sealing ring or gasket, wherein the extremities of the sealing lips are constructed of a particular shape which will effectively seal under low pressures, and which does not require close tolerances in manufacture.

A still further object is to provide an improved sealing assembly, of the character described, wherein the recess which receives the sealing ring extends beyond the sealing lips and also has an amplified supporting surface reinforcing the base surfaces of the ring to assure efficient operation under all pressure conditions; the construction also including improved means for initially mounting the ring in its recess prior to connection of the coupling members of the assembly.

The construction designed to carry out the invention will be hereinafter described together with other features of the invention.

Figure 2:
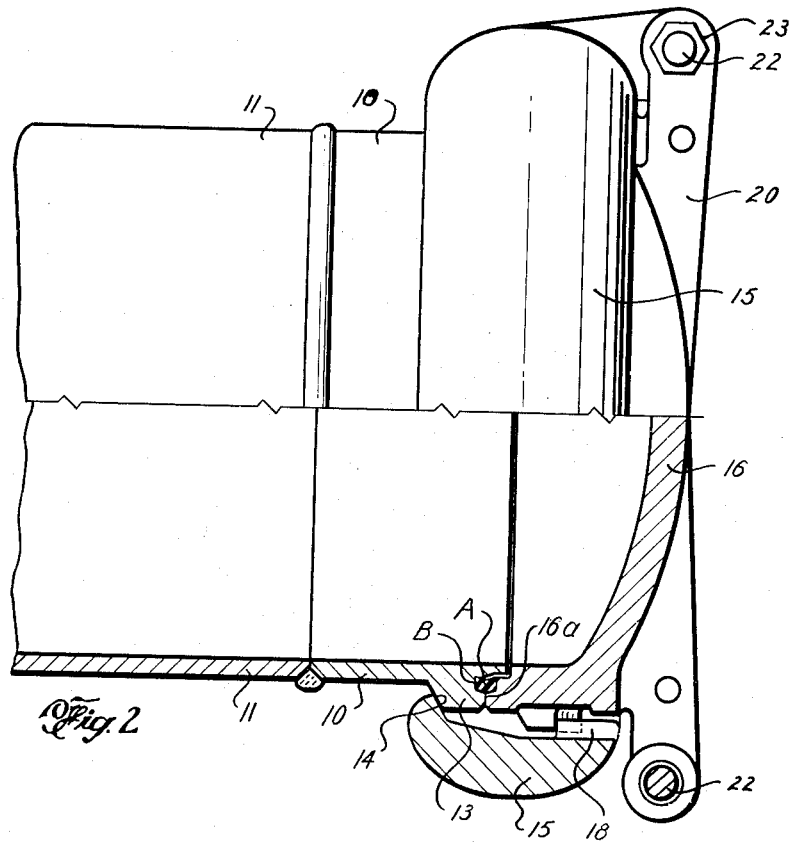
Figure 4:
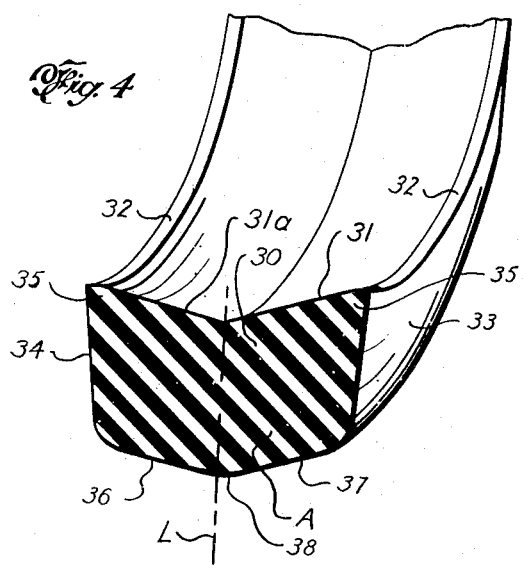

The invention will be more readily understood from a reading of the following specification and by reference to the accompanying drawings, wherein an example of the invention is shown, and wherein:

Figure 1 is an elevation of a scraper trap or closure for a pipe line and having the improved sealing assembly employed therein, Figure 2 is a transverse, sectional view, taken on the line 2—2 of Figure 1, Figure 3 is a partial elevation of one of the coupling members, Figure 4 is a partial isometric view of the improved sealing ring, Figure 5 is an enlarged sectional detail view of the sealing ring positioned in the groove of one of the coupling members, the complementary coupling member being omitted, Figure 6 is an enlarged sectional detail view, illustrating the sealing ring positioned within the grooves of both coupling members but with the coupling members in a position prior to their being moved to fully coupled position, and Figure 7 is a view similar to Figure 6 with the coupling members in fully coupled position and showing the sealing ring therebetween.

In the drawings, the numeral 10 designates an annular flanged sleeve or hub member which is adapted to be welded or otherwise secured to a flow line or conductor 11 which contains a pressure fluid. The sleeve is illustrated as comprising one member of the usual scraper trap for pipe lines and is formed with an outwardly directed flange 13 at its outer end. The external shoulder formed by the flange is beveled as shown at 14 and is arranged to coact with a locking ring 15 as will be explained. A closure or cover 16 is adapted to be secured to the sleeve or member 10 to close the end of the line or conductor 11, and as illustrated, the annular inner edge 16a of the closure is arranged to abut or engage the end 13a of the flange 13. The closure is formed with a plurality of helically disposed, arcuate shoes or lugs 17 which are spaced therearound and these lugs have wedge surfaces which coact with complementary locking lugs 18 provided on the locking ring 15. When the closure or cover 16 is placed in position adjacent the end of the flange, the locking ring 15, which has been rotated to a position allowing the lugs 18 to be inserted axially between the lugs 17 of the closure, has its inner end engaged over the beveled surface 14 of the flange 13; upon subsequent rotation of the locking ring 15, the coaction between the wedge surfaces of lugs 17 and 18 draw or move the end surface 16a of the cover 16 into engagement with the end surface 13a of the flange 13 and said lugs thereby function to lock the parts in this position.

For limiting the rotative movement of the locking ring 15 with respect to the closure 16, in order to limit the amount of inward pressure which may be applied through the cam or wedge action of the co-acting lugs 17 and 18, the closure or cover has stop collars 19 secured thereto, said collars being preferably made integral with the outer ends of web members 20 which are formed on the outer surface of said closure. A pair of annular stop lugs 20 are formed on the locking ring 15, and are arranged to engage the stop collars 19 of the closure to limit rotative movement of the ring with respect to said closure. Thus, it is apparent that the locking ring may be rotated only a predetermined amount to apply only a predetermined pressure to the closure 16 through the helically disposed, coacting shoes or lugs 17 and 18. The arrangement is such that the stop lugs 20 engage the stop collars 19 when the inner annular edge 16a of the closure has moved into engagement with the end 13a of the flange 13. Suitable bolts 22 and nuts 23 may be utilized to fasten the collars 19 to the lugs 20 to prevent accidental rotation of the locking ring 15 in a direction to release the closure or cover 16.

The foregoing arrangement which limits the tightening pressure which may be applied to the coupling members eliminates any possibility of overstraining the material by manual tightening pressure and therefore, makes it possible to construct the coupling members of a relatively light weight material such as aluminum, aluminum alloy or the like. However, because only a predetermined tightening pressure may be applied the seal between the coupling members must be capable of sealing under a wide range of pressures, from relatively low relatively high, and the improved sealing ring A, which is hereinafter described in detail, accomplishes this purpose.

For sealing the joint between the end 13a of the flange 13 and the end face 16a of the cover or closure 16, the improved annular sealing or packing element or ring A is disposed within an annular groove B formed between the members. As will be explained, the sealing element or ring A is arranged to effectively seal the joint between the flange and the closure over a wide range of pressure conditions. Because the locking ring 15 is constructed in the manner described, it is possible to apply only a predetermined initial pressure to the closure member 16 and to the sealing ring A, because obviously, rotative movement of the ring 15 is limited by engagement of its stop lugs 20 with the stop collars 19 of the closure. It is therefore obvious that any pressure applied to the closure and to the ring by the making up of the various parts is definitely controlled by the structure of the device, and any error due to the operator applying too much pressure upon initial connection is completely eliminated.

The annular groove B which is adapted to receive the sealing or packing element A is formed by recesses 24 and 25 which are formed in the abutting end surfaces 13a and 16a, respectively. The recess 24 has a straight wall 24a and an outer or base wall 24b while the recess 25 has a straight wall 25a which is substantially parallel to the wall 24a of the recess 24 and is also formed with an outer or base wall 25b. The walls 24a and 25a comprise the side walls of the groove B while the walls 24b and 25b define the base of the groove. The walls 24b and 25b are inclined and converge inwardly toward each other so that when the members 13 and 16 abut each other the base of the groove has the two surfaces converging toward the center of said base which is at the joint between the members (Figure 7).

The sleeve or flange member 10 is formed with an annular extension 26 which is arranged to be disposed within an annular step or recess 27 formed in the closure 16 adjacent the recess 25. When the closure is in connected position attached to the flange 13 of the member 10, the extension 26 overlies or extends beyond the groove B (Figure 6) but said extension is of such length and thickness that it is spaced from the wall of the recess 27 to provide a flow space C therebetween, whereby pressure from within the member 10 and conductor 11 may flow around said extension 26 and into said groove. An annular rib or projection 27 is formed integral with the inner surface of the extension 26 and overlies the groove B, being provided with inclined walls 27a and 27b. The wall 27a intersects the wall 24a of the recess 24 and has a flattened straight portion 27', while the wall 27b connects with the inner wall 26a of the extension 26.

The sealing or packing element or ring A is arranged to be mounted within the groove B formed by the coacting recesses 24 and 25 in the adjacent end faces of the flange 13 and the closure 16 and this element or ring is clearly shown in Figure 4. The ring comprises a body portion 30 having a generally V-shaped relatively shallow recess 31 in its inner peripheral surface. The walls 31a of the recess 31 diverge outwardly and inwardly from the center line L of the body 30 and said walls teminate in annular flat surfaces 32. The side walls 33 and 34 of the body are flared outwardly at an angle with respect to the center line L of the body, and these flared sides, together with the generally V-shaped recess 31, provide sealing lips 35. The annular flat surfaces 32 are at the outer extremity of said sealing lips. The base or outer periphery of the sealing element or ring A is formed with inclined surfaces 36 and 37 and the inclination of these surfaces are substantially complementary to the inclined base surfaces 24b and 25b which comprise the base of the groove B. A slight radius 38 is provided between the inclined surfaces 36 and 37 (Figure 4). The inclined surfaces 36 and 37 function to seat against the base surfaces of the groove B under high pressures while the sealing lips 35 formed by the flaring of the sides 33 and 34 and recess 31 function to initially seal under relatively low pressure conditions and subsequently to also seal under the higher pressures.

The sealing ring A is arranged to be mounted within the recess 24 of the flanged member forming one half of the groove B prior to the time that the cover or closure 16 is placed in position. The sealing ring A is engaged with the recess 24 beneath the extension 26, as illustrated in Figure 5, and the annular rib 27 or the extension is of such shape that its inclined walls 27a will engage the inclined surface 31a of the internal recess 31 of the ring so as to frictionally retain the sealing ring within the recess 24 until such time as the cover or closure member 16 may be placed in position. At the time that the sealing ring A is located only within the recess 24 as shown in Figure 5, the sealing ring is in a substantially normal undistorted position with the flared sides 33 and 34, which form the sealing lips 35, diverging outwardly. It is noted that the flat portion 27' of the wall 27a of the rib 27 is of greater area than the flat annular surface 32 of the sealing ring, whereby the ring may undergo limited movement relative to the rib without the surface 32 binding against the inclined surface 27a of said rib.

After the sealing ring is disposed within the recess 24, the cover or closure 16 which is the complementary member of the coupling is brought into position so as to engage the sealing ring A within the recess 25 of said cover. This results in the extension 26 on the flange member 13 being disposed within the stepped portion 27 and as the cover or closure is moved inwardly, the sealing ring A is confined between the straight side walls 24a and 25a of the groove B. Because the sides 33 and 34 of the sealing ring are flared outwardly, the coaction between the straight side walls 24a and 25a will result in applying a pressure to the sealing lips 35 with the sealing ring being distorted inwardly toward the center line L of the ring whereby the sealing lips move into a tight engagement with the walls 24a and 25a. The engagement of the ring with the walls of the groove is with a predetermined pressure which is dependent upon the preformed angle or flare of inclination of the walls of the sealing lips. At this time the inclined base surfaces 24b and 25b of the groove B move into engagement with the inclined outer peripheral surfaces 36 and 37 of the sealing ring.

As the locking ring 15 of the coupling structure is rotated to move the closure or cover 16 into its fully engaged position with the flange member, the inner face 16a of said closure or cover contacts the inner face 13a of the flange 13, as is shown in Figure 7. When the parts have assumed this position, the sealing lips 35 have been deformed inwardly so that the normally flared sides 33 and 34 of the sealing ring conform to the flat surfaces 24a and 25a of the recesses 24 and 25. The deformation of the sides 33 and 34 inwardly toward each other results in a slight bulging of the walls 31 and 31a as is clearly shown in Figure 7. The inward movement of the sealing lips 35 caused by the inward movement of the flared sides 33 and 34 also results in placing said lips under an initial preload and obviously, the inclination of the flared side walls 33 and 34 will control the amount of pressure under which the sealing lips are placed at this time. By varying the angle of the flared sides the preload pressure applied to the sealing ring may be controlled. Because of the thickness of the body portion 30 of the ring, together with the fact that the annular recess 31 in the ring is relatively shallow, the fulcrum point about which the flared sealing lips 35 will move as they are placed under a load is approximately at the point indicated at F in Figure 7. This means that the sealing lips 35 and the area of the body 30 therebetween are placed under compression with this compression being in accordance with the original angularity or flaring of the sides 33 and 34 of said lips. The remainder of the sealing ring which is that area adjacent the base sealing surfaces 36 and 37 and beyond the fulcrum point F is placed under a tension. Therefore, upon initial connection of the coupling members, the pressure sealing lips 35 are placed under a predetermined compression while the sealing surfaces 36 and 37 and the area adjacent thereto is placed under tension. It is noted that because the recess 31 is relatively shallow, a considerable portion of the body acts as a reinforcement for the sealing lips 35 so that said lips may engage the side walls of the groove with sufficient initial pressure to seal under low pressure conditions.

With the parts connected as shown in Figure 7, the pressure from within the conductor 11 may pass through the flow space C between the extension 27 and the closure 16 and may act upon the inner surface of the sealing ring A. Because the sealing lips 35 are under a predetermined initial load, said lips engage the walls of the groove B with a predetermined pressure and this pressure is sufficient to seal against leakage under relatively low pressures. It is noted that the annular flat surfaces 32 adjacent the outer extremity of the sealing lips 35 are of definite advantage in effecting a low pressure seal. It is not practical to manufacture the sealing lips with a sharp edge since it is difficult to hold each edge throughout the periphery of the ring. By providing the flat surfaces, it is possible to obtain a relatively sharp peripheral edge at the extremity of each lip whereby when the lips are placed under an initial pressure load an efficient seal may be obtained. By making the groove 31 relatively shallow, each sealing lip has a substantial portion of the body 31 reinforcing the same and this inner support lends a resistance to the body of the lip which causes said lip to engage the straight walls of the groove with ample pressure to effect a seal under low pressure conditions. It is pointed out that the depth of the recess 25, that is, the wall 25a of said recess which forms one side of the groove B is slightly greater than the depth of the side wall 33 of the sealing ring A, whereby the sealing lip 35 at that side of said ring may never extend beyond the wall 25a; it is apparent that if the sealing lip did project beyond the wall 25a a possibility of pressure leakage might be present.

From the foregoing, it will be seen that when the sealing ring is confined within the groove B, as shown in Figure 7, the sealing lips 35 and the area therebetween is under a compression, which, as has been explained, is predetermined by the flaring or angularity of said flaring lips. The remainder of the body of the sealing ring, which is that area adjacent the inclined base sealing surfaces 36 and 37 is under a tension because this area is beyond the fulcrum about which the sealing lips are moved when placed under initial pressure load by connection of the coupling members. When a high pressure from within the line or conductor 11 is applied through the flow space C to the inner surface of the sealing ring, such pressure will act upon the inclined surfaces 31a of the groove 31 in a direction indicated by the arrows D in Figure 7. This high pressure will tend to deform the sealing ring and said pressure will be exerted in a direction outwardly against all walls of the groove; this pressure will tend to separate the connection members 13 and 16 and open up the joint therebetween but will at the same time urge the sealing lips into tighter sealing engagement with the side walls of the groove and the base surfaces 36 and 37 into tighter engagement with the base walls of said groove. The tight engagement of the sealing lips as well as of the surfaces 36 and 37 with the walls of the groove B will effect an efficient seal and obviously, the greater the pressure the greater will be the sealing contact at this point.

If the connecting members of the coupling become slightly separated by the pressure to slightly open the joint, the particular construction of the present sealing ring will prevent said ring from being extruded or forced outwardly into this separated joint. As explained, the area adjacent the base surfaces 36 and 37 is under an initial tension and before the pressure can force any part of the sealing ring into the separated joint, this tension must first be overcome to return the sealing ring to an initial undeformed condition in this area. Thus, the initial preload which places the area adjacent the base sealing surfaces 36 and 37 under tension results in actually reinforcing the area adjacent these base surfaces to prevent extrusion of the ring outwardly into the separated joint between the coupling members.

It is pointed out that the usual pipe line coupling unions or members, such as the scraper trap arrangement herein illustrated, are restricted in size, and therefore it is desirable to maintain as much strength as possible in said members while still forming the sealing ring groove B therein. In the construction illustrated, the inclination of the base walls 24b and 25b allow for strengthening the surfaces which back up or engage the base sealing surfaces 36 and 37 of the ring so that maximum strength is had. Where the base of the groove B is at substantially a right angle to the side walls, a notch effect which allows the concentration of stresses at the corner is produced and this disadvantage is eliminated in the present structure. Further additional strength in the area behind the sealing ring is had when the joint between the connected members 13 and 16 is disposed at substantially the center line of the groove since each base surface 24b and 25b may be extended a lesser distance from its point of attachment to its respective member.

The particular sealing ring together with its cooperating groove which receives the same has been found effective to seal over a wide range of pressures, with the sealing lips 35 functioning to initially seal under the relatively low pressures and subsequently under the higher pressures, when subjected to said higher pressures. The ring has been illustrated as sealing the joint between a flanged member at the end of the pipe or conductor and a closure or cover member but it is apparent that the sealing ring may be employed for sealing any joint and may be employed with any type of pipe union or coupling ordinarily used for connecting flow conductors or pipe lines. As has been noted, the efficiency of the sealing member to seal over a wide range of pressures makes it unnecessary to apply initial preload by excessive tightening of the coupling members and therefore, the coupling members are never required to withstand manual tightening pressures, whereby it is possible to manufacture the members of a light weight material, such as aluminum alloy. The invention therefore, contemplates the provision of a light weight high pressure coupling device.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A sealing ring comprising, an annular flexible body having side walls, an outer peripheral surface and an inner peripheral surface, said inner peripheral surface having a relatively shallow recess as compared to ring thickness which is defined by a pair of conic walls which diverge in a direction inwardly of the ring and extending outwardly from the peripheral center of the inner surface to the inner periphery of the side walls of the body, said side walls of the body diverging in a direction from the outer periphery to the inner periphery of the body and having those portions adjacent the inner periphery of the body co-acting with the conic diverging walls of the recess to form relatively short outwardly flaring sealing lips at the inner peripheral portion of the body, the depth of said recess being such that when the sealing lips are urged axially together that portion of the body adjacent the recess and the lips is compressed to build up a residual force tending to urge the sealing lips outwardly to effect a seal under low pressures, the outer peripheral surface of the body being formed by a pair of annular sealing surfaces which diverge with respect to each other from the center of the outer peripheral surface inwardly to the side walls of the body, with the inclination of the sealing surfaces directing the apex between the surfaces at the outermost point of the peripheral surface.

2. A sealing ring as set forth in claim 1, wherein a cylindrical surface is formed at the intersection between each conic diverging wall which defines the shallow recess and the inner periphery of its adjacent side wall.

3. A sealing assembly including, a pair of tubular members arranged to be connected to each other and means for sealing the joint therebetween, said means comprising an annular groove which is formed at the joint between the members when said members are in abutting relation connected to each other, said groove being defined by parallel side walls, an outer peripheral base wall and an inner peripheral wall, said outer base wall being formed by a pair of inclined surfaces which meet at the peripheral center of said base wall and which diverge toward the side walls at an inclination which directs the apex of the outer wall toward the outer surfaces of the connected members, and a sealing ring within the groove, said sealing ring having its outer peripheral surface formed of inclined surfaces which are complementary to and which engage the inclined surfaces of the base wall of the groove, said ring having its side walls non-parallel and diverging in a direction from the outer periphery of the ring to the inner periphery thereof, the inner peripheral surface of the ring having a shallow recess as compared to ring thickness which is defined by a pair of conic walls which diverge in a direction inwardly of the ring and extending outwardly from the peripheral center of said inner surface to the inner periphery of the side walls, each diverging conic wall co-acting with its adjacent side wall to form relatively short sealing lips, the transverse width of the ring being greater than the distance between the side walls of the groove whereby when the ring is within the groove the flared walls and short sealing lips thereof are urged inwardly toward each other, the depth of the recess in the inner periphery of the ring being such that when the short sealing lips are urged axially together that portion of the ring adjacent the recess and the lips is placed under a compressive load to build up a residual force tending to urge the sealing lips outwardly to effect a seal under low pressure, and means for conducting the pressure which is within the tubular members against the inner peripheral surface of the sealing ring.

4. A sealing ring as set forth in claim 3, wherein a cylindrical surface is formed at the intersection between each conic diverging wall which defines the shallow recess and the inner periphery of its adjacent side wall.

5. A sealing assembly including, a pair of tubular members adapted to be connected to each other and constructed of a relatively light weight material, means on one member for limiting the movement of the members with respect to each other during the coupling thereof whereby the tightening pressure which may be applied to the material of which the members are constructed is limited, said tubular members having coacting recesses in the abutting surfaces thereof defining an annular groove between the members when the members are connected, said groove having parallel side walls and a base wall which is formed of a pair of inclined surfaces which incline in a direction to dispose the apex of said base wall toward the outer surfaces of the tubular members, one of the tubular members having an annular rib member which overlies substantially one half the area of the groove and presents an inclined surface within the groove which is substantially parallel to one of the inclined surfaces of the base wall of the groove, an annular sealing element within the groove and having a shallow V-shaped recess as compared to ring thickness in its inner peripheral surface whereby relatively short sealing lips are formed on the element adjacent the inner periphery of the side walls of the element, the transverse width of the sealing element being greater than the transverse width of the groove in the tubular members whereby when the coupling members are in their fully connected position the short sealing lips are moved together in a direction axially inwardly of the sealing element, the depth of the V-shaped recess being such that upon inward movement of the sealing lips the area of the element adjacent the recess and the lips is compressed to build up a residual force tending to urge the sealing lips outwardly to effect a seal under low pressure, said sealing element having one of its sealing lips engaged beneath the inclined surface of the annular rib which overlies a portion of the groove, and means for exposing the shallow recess of the sealing element to the pressure within the tubular member whereby said pressure urges the element into tighter sealing engagement with the groove under higher pressures.

References Cited in the file of this patent

UNITED STATES PATENTS

| Number | Name | Date |
|---|---|---|
| 147,498 | Henderson | Feb. 17, 1874 |
| 1,450,126 | Wilson | Mar. 27, 1923 |
| 1,486,777 | McWane | Mar. 11, 1924 |
| 1,802,177 | Knight | Apr. 21, 1931 |
| 1,832,054 | Sexton | Nov. 17, 1931 |
| 2,025,112 | Laurent | Dec. 24, 1935 |
| 2,038,629 | Bates | Apr. 28, 1936 |
| 2,170,010 | Conner | Aug. 22, 1939 |
| 2,204,507 | Martin | June 11, 1940 |
| 2,318,112 | Stillwagon | May 4, 1943 |
| 2,330,197 | Allen et al. | Sept. 28, 1943 |
| 2,477,533 | Whiting | July 26, 1949 |
| (filed Oct. 19, 1946) | | |
| 2,486,120 | Colton et al. | Oct. 25, 1949 |
| 2,518,443 | Bagnard | Aug. 15, 1950 |
| (filed Feb. 18, 1948) | | |

FOREIGN PATENTS

| Number | Country | Date |
|---|---|---|
| 486,262 | Germany | Nov. 14, 1929 |
| 595,332 | France | July 13, 1925 |